May 15, 1928. 1,669,818

J. E. GLEASON ET AL

MACHINE FOR PRODUCING GEARS

Original Filed Sept. 5, 1924 7 Sheets-Sheet 1

INVENTORS:
JAMES E. GLEASON
ERNEST C. HEAD

BY
THEIR ATTORNEY

May 15, 1928.

J. E. GLEASON ET AL 1,669,818

MACHINE FOR PRODUCING GEARS

Original Filed Sept. 5, 1924      7 Sheets-Sheet 2

INVENTORS
JAMES E. GLEASON
ERNEST C. HEAD.

BY
THEIR ATTORNEY

May 15, 1928. 1,669,818

J. E. GLEASON ET AL

MACHINE FOR PRODUCING GEARS

Original Filed Sept. 5, 1924    7 Sheets-Sheet 3

INVENTORS
JAMES E. GLEASON
ERNEST C. HEAD

THEIR ATTORNEY

May 15, 1928. 1,669,818

J. E. GLEASON ET AL.

MACHINE FOR PRODUCING GEARS

Original Filed Sept. 5, 1924   7 Sheets-Sheet 4

INVENTORS
JAMES E. GLEASON.
ERNEST C. HEAD.

BY B. E. Shlesinger
THEIR ATTORNEY

May 15, 1928.

J. E. GLEASON ET AL 1,669,818

MACHINE FOR PRODUCING GEARS

Original Filed Sept. 5, 1924    7 Sheets-Sheet 5

INVENTORS
JAMES E. GLEASON
ERNEST C. HEAD.
BY
THEIR ATTORNEY

May 15, 1928.

J. E. GLEASON ET AL 1,669,818

MACHINE FOR PRODUCING GEARS

Original Filed Sept. 5, 1924    7 Sheets-Sheet 7

INVENTORS
JAMES E. GLEASON.
ERNEST C. HEAD.
BY
THEIR ATTORNEY

Patented May 15, 1928.

1,669,818

UNITED STATES PATENT OFFICE.

JAMES E. GLEASON AND ERNEST C. HEAD, OF ROCHESTER, NEW YORK, ASSIGNORS TO GLEASON WORKS, OF ROCHESTER, NEW YORK, A CORPORATION OF NEW YORK.

MACHINE FOR PRODUCING GEARS.

Original application filed September 5, 1924, Serial No. 736,100. Divided and this application filed May 15, 1925. Serial No. 30,496.

The present invention relates to a machine for producing gears, and relates in particular to a machine adapted to operate upon gears which have previously been cut by what is known as a generating process.

One object of the invention is to provide a machine for treating gears so as to reduce to a minimum such imperfections as may exist on the tooth surfaces of generated gears and also to increase the strength of the teeth.

A further object of the invention is to eliminate flats, high spots, tool marks or other irregularities of the tooth surfaces of a gear by rolling a toothed blank with a master gear whose tooth surfaces are formed as perfect as possible, and applying considerable pressure to force the master gear and blank together, so as to roll or press out the imperfections of the tooth surfaces on the blank until it exactly conforms to the master gear.

A further object of the invention is to provide a machine in which a previously generated blank may be rolled under considerable pressure, while cold, with a master gear, and in which are incorporated bearings arranged to receive both the radial and axial thrusts, produced by the rolling movement of the master gear and blank under pressure, so as to permit operation of the machine with a minimum of power and so as to equalize the pressure on both faces of the teeth of the blank being rolled.

Other objects will be apparent hereinafter from the specification and from the recitation of the claims.

With the above and other objects in view, the invention resides in the combination of parts and in the novel elements described in the specification, illustrated in the drawings or set forth in the claims.

The tooth surfaces of gears produced in a cutting operation are not always sufficiently smooth to meet present day requirements as to quietness of operation. Grinding has been more and more resorted to, in order to secure the desired finish. Grinding the gears is, however, oftentimes more expensive than circumstances warrant particularly because of the time required in the operation. We have discovered that if the cut gears are rolled, before hardening, with a master gear, under a considerable pressure, the imperfections of the cut surfaces will be rolled out and gears will be produced having the desired tooth surface finish. This operation requires much less time and is less expensive than grinding. The present invention has for its purpose the provision of a machine for rolling a previously generated blank with a master gear under the required pressure, with the object of imparting to the tooth surfaces of the cut gear a very smooth finish.

This application is a division of our application, Serial No. 736,100, filed September 5, 1924, for a method of producing gear teeth.

Figure 1:
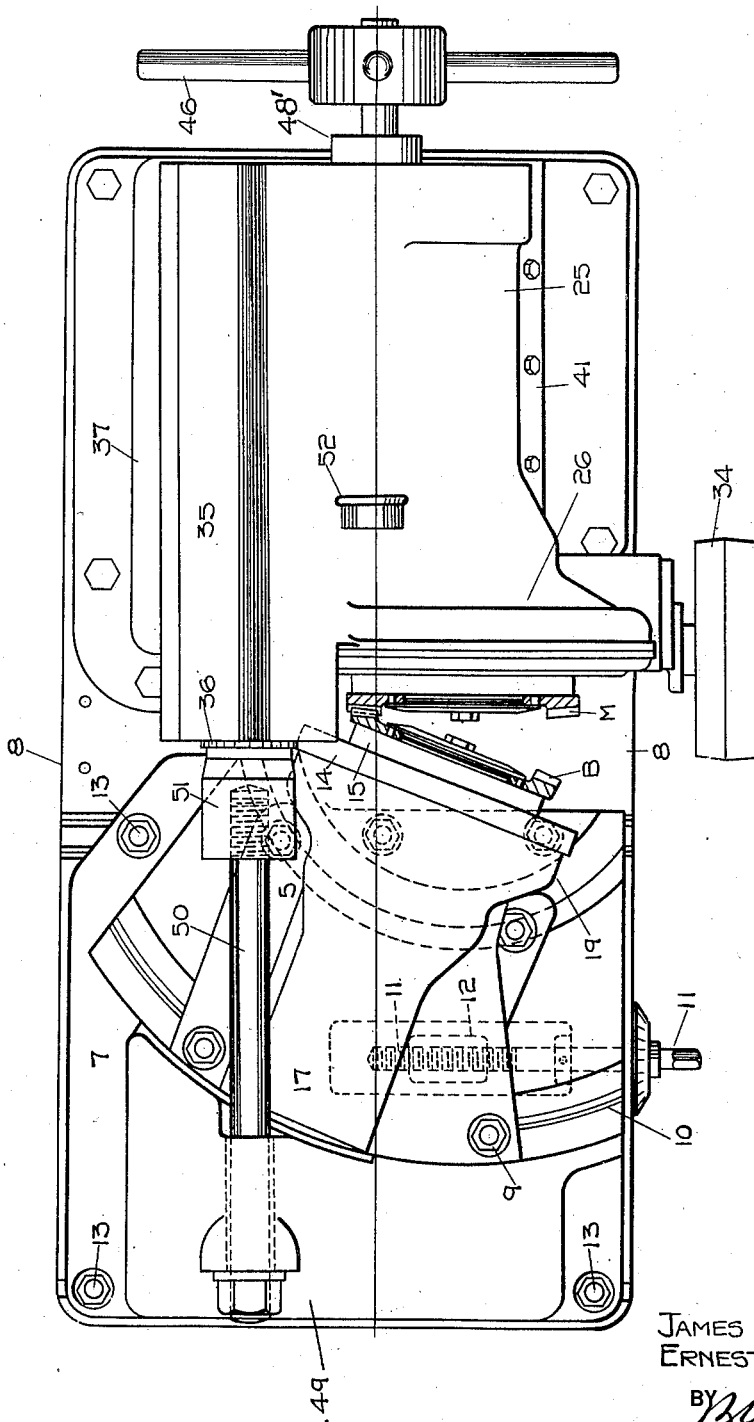
Fig. 1 is a plan view of a machine constructed according to one embodiment of this invention, as arranged for operation upon a bevel gear blank.
Figure 2:
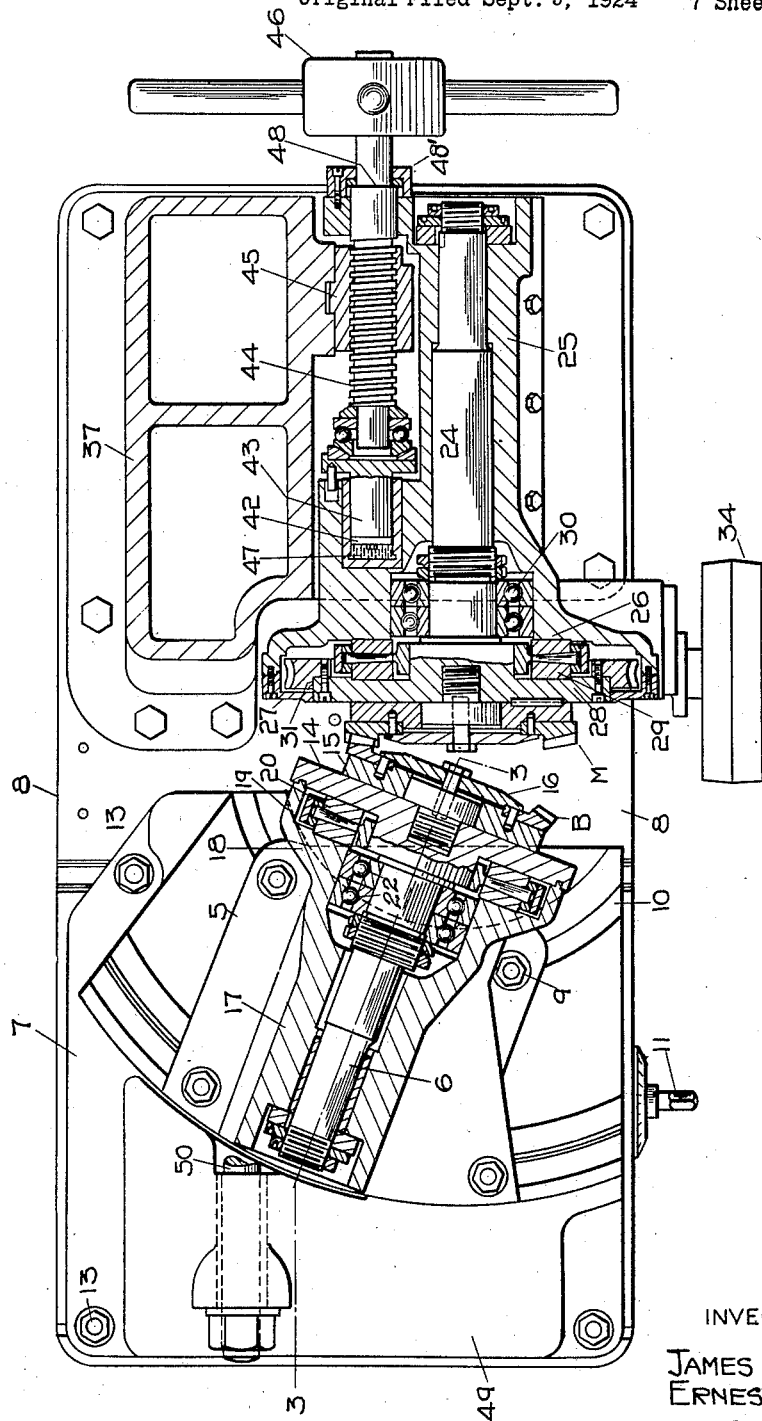
Fig. 2 is a horizontal section of the parts shown in Fig. 1.
Figure 3:
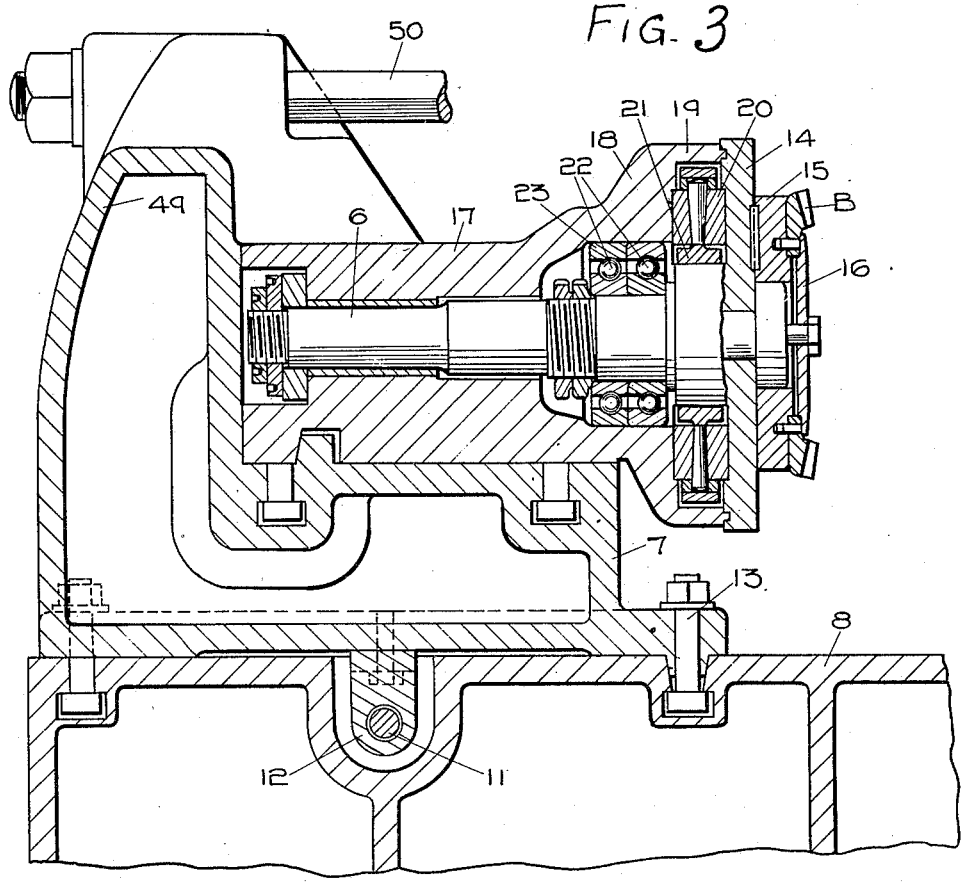
Fig. 3 is a vertical section on the line 3—3 of Fig. 2.
Figure 4:
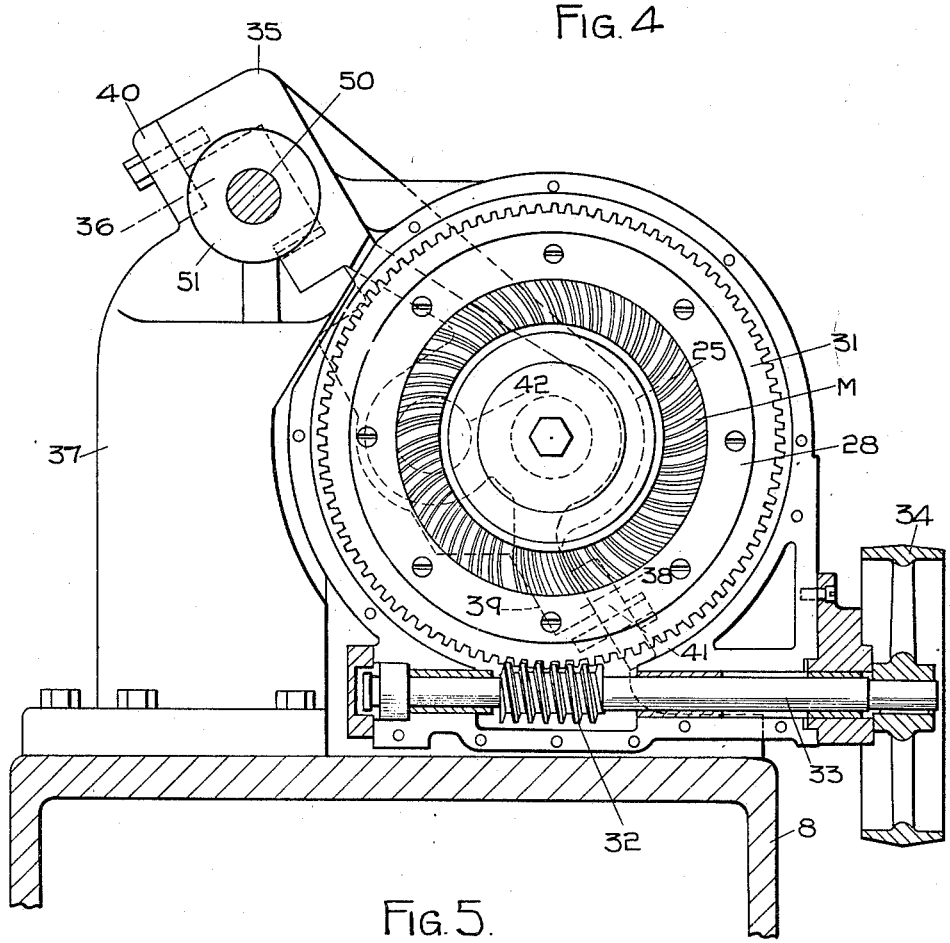
Fig. 4 is a transverse sectional view of the machine, showing the master gear and its driving parts in end elevation.
Figure 5:
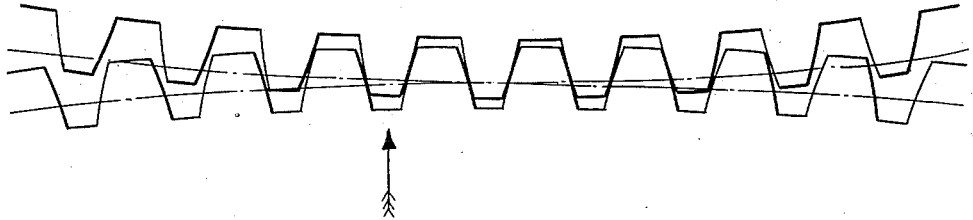
Fig. 5 is a diagrammatic view showing the manner in which the master gear and blank engage during the operation of the machine.

Referring first to Figs. 1 to 5, 5 designates a table upon which the blank spindle 6 is journaled. This table 5 is angularly adjustable on a base 7 to permit positioning of the blank and master gear to the proper pitch angle adjustment. The base 7 is horizontally adjustable on the bed or frame 8 of the machine to permit adjustment of the blank spindle 6 in a direction at right angles to the axis of the master gear so as to insure a proper pressure-angle upon the rolled blank. Adjustment of the table 5 may be effected in any desired manner, as is well known in the art, and the table may be fastened in any adjusted position by the bolts 9 which engage in the ways 10 formed on the base 7. Adjustment of the base 7 is effected by means of the screw 11 which engages a nut 12 carried by the base. The bolts 13 serve to retain the base in any adjusted position.

The blank spindle 6, as previously stated, is journaled in the table 5 and is provided with a head 14 on which is mounted a ring 15 to which the blank B is secured, being clamped against the ring 15 by means of the plate 16.

One feature of this invention is that the blank and master gear are so engaged under pressure that the blank can be correctly and positively driven by its engagement with the master gear. The pressure that is effected between the master gear and the blank, however, is so great as to generate a tremendous friction. In the practical operation of the machine this friction is largely eliminated, while at the same time the positive drive between the master gear and blank is maintained, without requiring timing gears, by the use of radial and axial thrust bearings.

The upright portion 17 of the table 5 is provided with an end face 18, arranged opposite to the head 14, and terminating in an angular extension 19 which has a dust proof connection with the head. Between the face 18 and the head 14 are arranged anti-friction bearings 20 of any suitable form, carried by a suitable retaining ring 21, journaled on the blank spindle. These bearings receive the end or axial thrust of the blank spindle set up by the pressure of the master gear against the blank, and reduce the friction created by such end thrust so that very little resistance is offered to the free turning of the blank spindle, whereby the machine may be operated with a minimum of power, one-sixth to one-third horse power being usually all that is required.

Arranged within the housing or upright portion 17 of the table 5, and surrounding the spindle 6 are other bearings 22 arranged within suitable cages 23 and acting to receive the radial thrusts of the spindle 6 which are set up by pressure between the gear blank and the master gear.

With the structure described, all thrusts or loads on the blank spindle are received by the roller bearings 21 or the ball bearings 22 so that the blank and its supporting spindle can be readily turned by the master gear. This arrangement reduces friction to a minimum and insures maintaining a proper and accurate relationship between the gear blank and master gear without backlash.

The master gear M is mounted on a spindle 24 journaled in a support or housing 25, which includes the end face 26 and the dust plate 27. The master gear is secured to the head 28 of the spindle 24 by a ring and plate similar to those used for securing the blank B to its spindle 6. Between the end face 26 and the head 28 are arranged roller bearings 29 which are similar to the bearings 20 and which serve to take up the end thrusts on the master gear spindle 24. Surrounding the master gear spindle 24 are ball bearings 30 which serve to take up radial thrusts of the spindle.

In the operation of the machine, the master gear will be forced into engagement with the blank and will be rotated while in such engagement, the blank being also rotated because of its engagement with the master gear. The master gear spindle 24 may be driven in any suitable manner. As shown, the spindle head 28 has secured to it a worm wheel 31 which is rotated by a worm 32 mounted on the shaft 33 which is rotated by the pulley 34 from any suitable source of power.

The master gear is moved longitudinally of the spindle 24 to force it into engagement with the blank. For the purpose of guiding the master gear spindle in its longitudinal movement, the housing 25 is provided with an overhanging portion 35, which is movable on the guide way 36 formed on the upper end of the vertical portion 37 of the frame or bed 8, and with an extension 38 which slides on the guide surface 39 of said upright portion 37. Removable guide plates or lugs 40 and 41 serve to retain the housing 25 on the upright 37.

The endwise or longitudinal movement, necessary to force the master gear, under pressure, into engagement with the gear blank is accomplished in the following manner. 42 designates a cylinder provided on the housing 25 and 43 a piston movable in said cylinder. The piston 43 is actuated by a screw 44 which turns in a stationary nut 45 fixed in the upright 37 and which is provided at its outer end with an operating hand wheel 46. By turning the hand wheel 46 and the screw 44 the piston 43 serves through the fluid medium 47 in the cylinder 42 to force the housing 25 and the spindle 24 with the master gear M toward the gear blank B, during the rolling operation, so as to move the master gear into the desired engagement with the blank. To withdraw the master gear, the hand wheel 46 is turned in the opposite direction whereupon a shoulder 48 on the screw 44 engages a collar 48' that is fixed to the support 25, thus withdrawing the support and master gear away from the blank.

In order to make the machine as rigid as possible, and to distribute the strains evenly, the base 7 is provided with a vertical portion or standard 49 to which is adjustably and rigidly secured a tie rod 50 which is adjustably mounted at its opposite end in a sleeve 51, fixedly mounted on the vertical portion or standard 37 of the bed.

52 designates a pressure indicator connected with the cylinder 42 and serving to indicate to the operator the amount of pressure exerted at any time between the master gear and blank.

From the preceding description, it will be seen that the axial bearings 20 and 29 have been so arranged behind the blank head 14 and the master gear head 28, respectively, as to reduce the friction resisting the turning of the gears because of the great pressure under which they are engaged, and at the same time form a rigid backing to fully take up end thrusts on the gears, while the radial bearings 22 and 30 are so positioned, respectively, as to offset any frictional resistance to the rotation of the blank and master gear spindles in their respective supports. By employing these two types of bearings, then, the total frictional resistance to the turning of the gears is so reduced that, despite the great pressure under which they are engaged, the two gears will rotate freely on their axes and the master gear will drive the blank positively and at the proper rate. By this construction, the machine may be operated with a minimum of power and at the same time, the use of timing gears, which might otherwise be required to maintain a fixed velocity ratio between master gear and blank, is obviated. It will be understood, of course, that we do not desire to be limited to the particular construction shown, as the anti-friction bearings may be of any suitable type and may be located in other positions so long as the desired effect described above is obtained.

Figure 10:
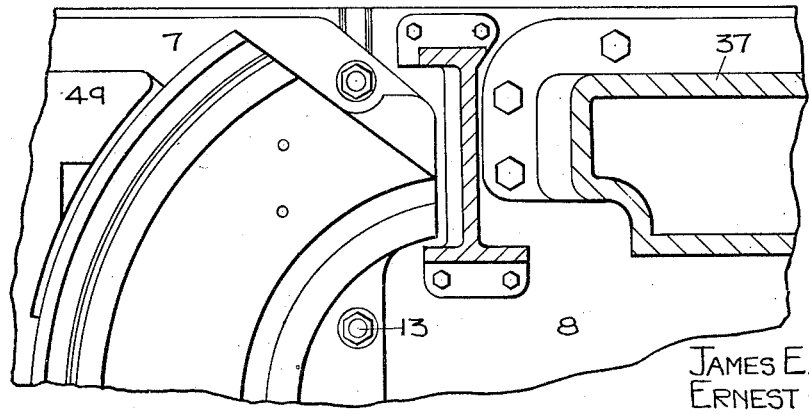
Fig. 10 is a horizontal sectional view on the line 10—10 of Fig. 8.
Figure 6:
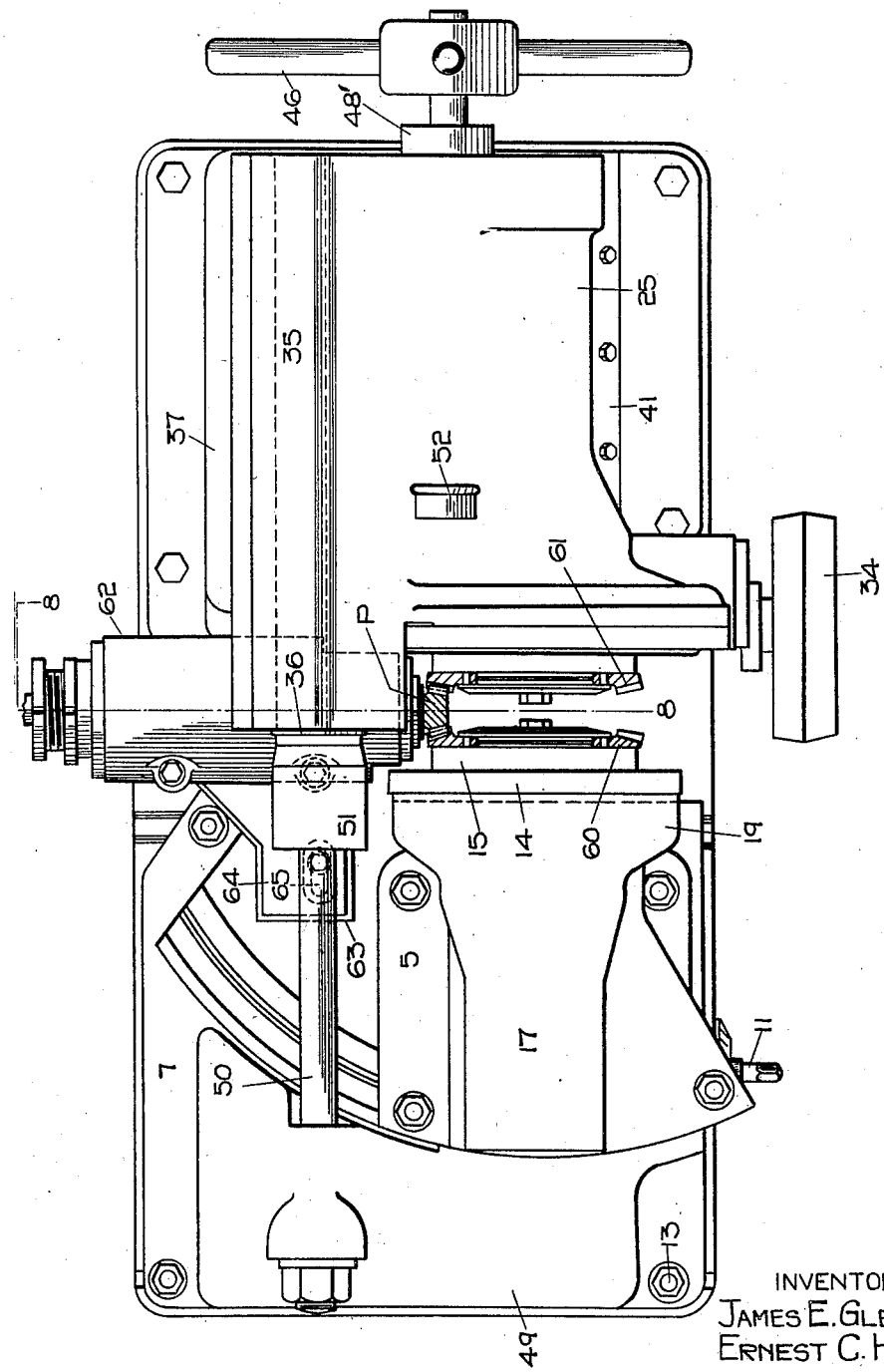
Fig. 6 is a plan view showing a modified arrangement of the invention, adapted to operate upon a bevel pinion.
Figure 7:
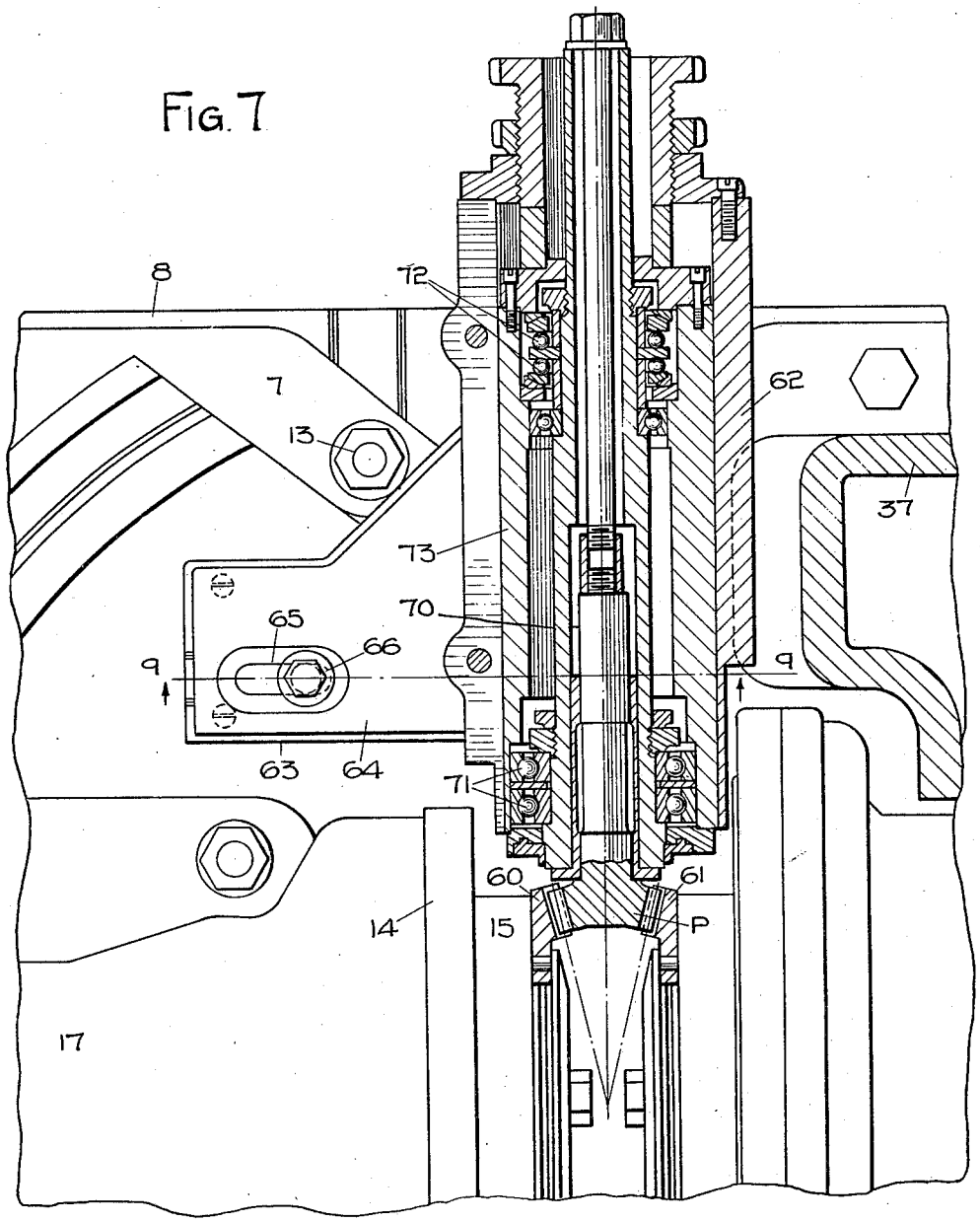
Fig. 7 is a horizontal sectional view, of the machine of Fig. 6, showing particularly the supporting means for the bevel pinion.
Figure 8:
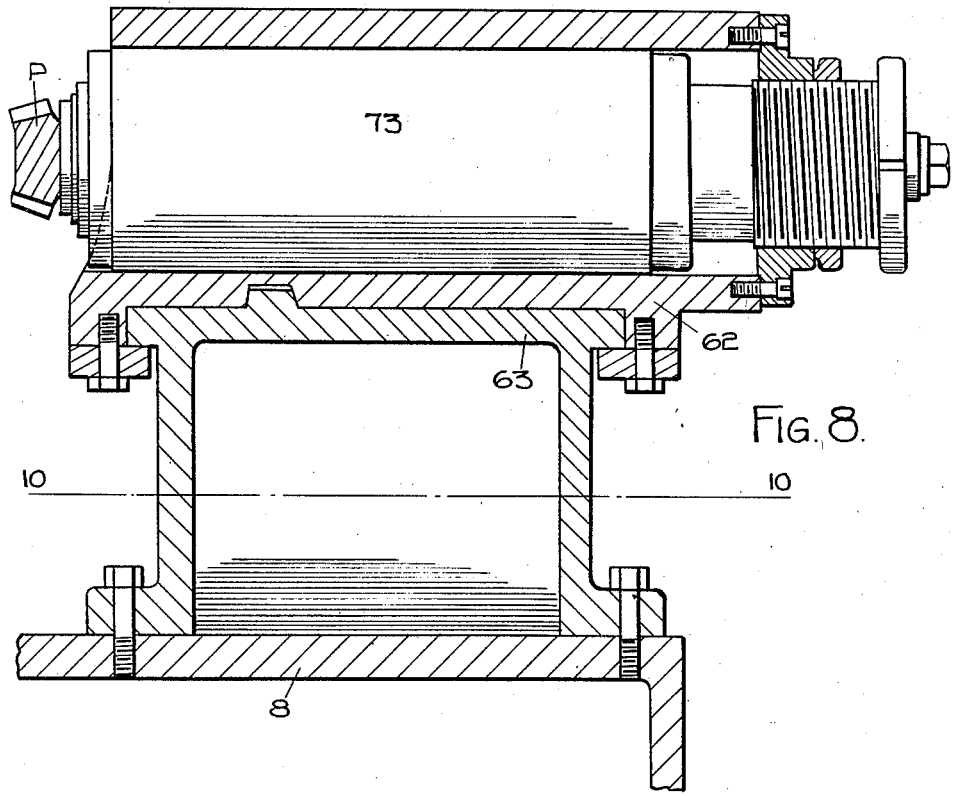
Fig. 8 is a vertical sectional view on the line 8—8 of Fig. 6.
Figure 9:
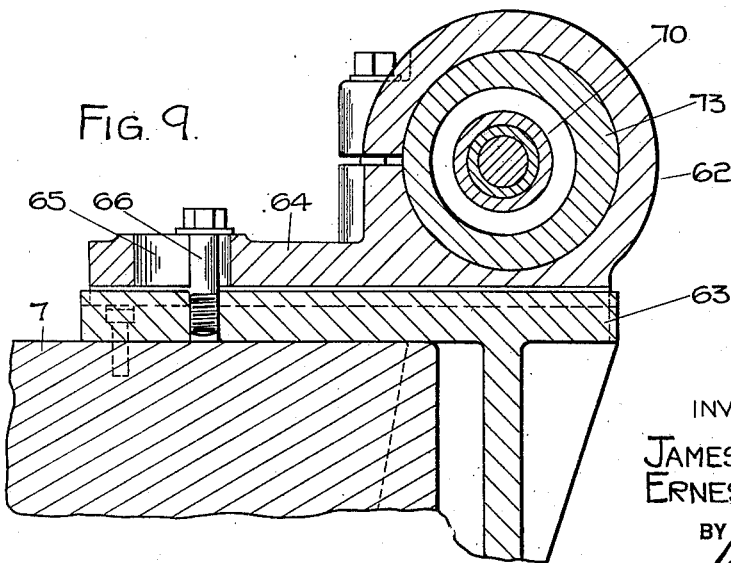
Fig. 9 is a vertical sectional view on the line 9—9 of Fig. 7.

In Figs. 6 to 10 is illustrated an embodiment of this invention, in which mechanism is provided for rolling a bevel pinion. P designates the pinion blank which is rolled between two master gears 60 and 61. Preferably, the support for the master gear 60 is stationary, while provision is made for moving the master gear 61 and the pinion P bodily toward the master gear 60, so as to roll the pinion under considerable pressure between the two master gears. The supporting and operating parts for the master gear 61 are the same as those already described with respect to the master gear M. The table 5 and housing 17 may be employed to support the second master gear 60 in the manner described with reference to the gear blank B, the table 5 being adjusted on the base 7 to a position in line with the position of the master gear 61, as shown. The pinion blank P is mounted on a spindle 70 which is journaled within a support 62 that is slidable on the stationary frame 63 which may be secured to the bed or frame 8, intermediate the table 5 and housing 25, as shown. The support 62 includes a base plate 64 which is slotted at 65 for cooperation with a guide pin 66 mounted on the guide 63. By the arrangement described, it will be seen, that as the master gear 61 is moved toward the pinion blank P by the hand wheel 46, it will engage the pinion blank and force the latter together with its support toward the master gear 60.

In order to reduce the friction set up by the pressure exerted by the pinion rotation under pressure, the pinion blank P is mounted on a spindle 70 which is provided with anti-friction radial thrust bearings 71 and anti-friction axial thrust bearings 72 to receive the radial and axial thrusts respectively. The master gear supports, as already described, are, also, provided with radial and axial anti-friction thrust bearings. Through the use of these anti-friction bearings, the master gears and pinion blank can be rolled together with the employment of a minimum of power and without the use of timing gears to maintaining a proper velocity ratio. In order to permit the necessary adjustment of the pinion blank to bring its teeth to the proper position with reference to the master gears 60 and 61, the spindle 70 is mounted in an eccentric sleeve 73. By turning this sleeve the required adjustment of the blank may be obtained so as to insure a proper pressure angle on the teeth after rolling.

The operation of the machine, briefly, is as follows. The blank is secured on its spindle and its support adjusted until the proper pitch and pressure angle relations with the master gear are obtained. Power is then applied to the pulley 34, causing the master gear to rotate and turn the gear blank. The desired pressure between the master gear and blank may be effected, during rolling, by turning the hand wheel 46. This pressure will vary from two to fifteen tons in ordinary practice. Where the blank teeth are oversize, rolling is continued and additional pressure applied in successive operations until the master gear and blank are at the proper depth of engagement or preferably until their pitch surfaces contact. When this point of engagement is reached, the blank will have been reduced to the size and shape of the master gear which is then withdrawn.

Preferably the operation is performed on a blank which is first cut by a generating process, although the blank may be formed in some other manner, and the blank is rolled with the master gear while cold. After the cold rolling operation is completed the blank is casehardened and ready for use. The master gear is made as nearly perfect as possible. Preferably the blank to be operated upon in the machine of this invention is made with teeth slightly thicker than required for the finished product. This additional thickness which may be from two to five thousandths of an inch is rolled off by the master gear, thus eliminating imperfections or irregularities of the tooth surfaces of the blank, causing the blank to conform to the master gear, and strengthening the teeth of the blank so that they will retain their shape and be less distorted during the hardening operation.

While we have described a mechanism in which power is applied to the master gear, equally efficient results can be had by applying the power to the blank and either master gear or blank may be forced into engagement one with the other.

While we have described our invention with particular reference to the production of bevel gears, and particularly to the production of bevel gears having longitudinally curved teeth, it will be understood that, with suitable modifications, it is equally applicable to the production of spur and other types of gears.

While we have described particular embodiments of our invention, it is to be understood that the invention is capable of various further modifications without departing from its intent, and that this application is intended to cover any adaptations or embodiments, following, in general, the principles of the invention and including such departures from the present disclosure as come within known or customary practice in the gear art and may be applied to the essential features hereinbefore set forth and as fall within the scope of the appended claims.

Having thus described our invention what we claim is:

1. The combination with a spindle adapted to support a bevel gear blank, of a second spindle for supporting a master gear, said spindles being arranged in angular relation to permit rolling of the master gear with the bevel blank, heads on the spindles against which the blank and master gear are respectively held, supports for the spindles including end faces opposite to the heads on the spindles, anti-friction axial bearings arranged between said end faces and heads in order to reduce the friction set up by endwise thrust of the spindles, means for rotating one only of said spindles to effect solely through the intermeshing engagement of master gear and blank a rotational movement of each spindle, to roll the master gear and blank together, and means for effecting a considerable relative pressure between master gear and blank during said rolling motion.

2. The combination with a spindle adapted to support a bevel gear blank, of a second spindle for supporting a master gear, said spindles being arranged in angular relation to permit rolling of the master gear with the blank, heads on the spindles against which the blank and master gear are respectively held, supports for the spindles including end faces opposite to the heads on the spindles, anti-friction axial bearings arranged between said end faces and heads in order to reduce the friction set up by endwise thrust of the spindles, and radial bearings co-operating with said spindles anti-friction acting to reduce the friction set up by the radial thrust of the spindles, means for imparting a relative rotational movement between said spindles, the velocity of which is controlled solely by the intermeshing engagement of master gear and blank and means for effecting a considerable relative pressure between master gear and blank during said rolling motion.

3. The combination with a spindle adapted to support a gear blank, of a second spindle for supporting a master gear adapted to have rolling engagement with the blank, instrumentalities for effecting considerable relative pressure between the master gear and blank comprising a movable support for one of said spindles, pressure means connected with said support consisting of a cylinder, a relatively movable piston, and a liquid medium interposed in the path of the piston and permitting considerable pressure with slight yieldability between the master gear and blank.

4. The combination with a spindle adapted to support a gear blank, of a second spindle for supporting a master gear adapted to have rolling engagement with the blank, means for rotating one only of said spindles to effect solely through the intermeshing engagement of master gear and blank a rotational movement of each spindle, to roll the master gear and blank together, instrumentalities for effecting considerable relative pressure between the master gear and blank comprising a movable support for one of said spindles, pressure means connected with said support consisting of a cylinder, a relatively movable piston, a liquid medium interposed in the path of the piston and permitting considerable pressure with slight yieldability between the master gear and blank, and anti-friction radial bearings for said spindles.

5. The combination with a spindle adapted for supporting a bevel gear blank, of a second spindle arranged at an angle to the first mentioned spindle for supporting a master gear having rolling engagement with the blank, anti-friction radial and axial bearings for the spindles, means for effecting considerable relative pressure between the master gear and blank comprising a movable support for one of said spindles, instrumentalities for actuating the support consisting of a relatively movable cylinder and piston, and a liquid medium in the path of the piston permitting considerable pressure between the master gear and blank with slight yieldability.

6. The combination with a spindle for supporting a master gear, of a spindle for supporting a gear blank, means for adjusting said spindles relatively to each other to engage the master gear and blank under considerable relative pressure, means for imparting a relative rotational movement between said spindles, the velocity of which is controlled solely by the intermeshing engagement of blank and master gear under pressure and anti-friction bearings for absorbing the thrusts and reducing the friction set up by the relative rotational movement.

7. The combination with a spindle for supporting a master gear, of a second spindle arranged at an angle thereto and adapted to support a tapered gear blank, means for adjusting one of said spindles bodily to offset the axis of the gear carried thereby relatively to the axis of the gear carried by the other spindle, means for adjusting said spindles relatively to each other to engage said master gear and blank under a considerable relative pressure and means for rotating said spindles to roll said master gear and blank in engagement under pressure.

8. The combination with a spindle for supporting a master gear, of a second spindle arranged at an angle thereto and adapted to support a tapered gear blank, means for adjusting one of said spindles bodily to offset the axis of the gear carried thereby relatively to the axis of the gear carried by the other spindle, means for adjusting one of said spindles bodily to move the gear carried thereby in a direction substantially at right angles to the axis of the other spindle, means for adjusting said spindles relatively to each other to engage said master gear and blank under a considerable relative pressure and means for rotating said spindles to roll master gear and blank in engagement under pressure.

9. The combination with a master gear, of a pinion having rolling engagement with said master gear, a spindle for the pinion, a support for the spindle movable toward said master gear, a second master gear having rolling engagement with the pinion and arranged opposite to the first mentioned master gear, means for moving the second master gear and pinion toward the first named master gear to engage all of said gears under considerable pressure and means for rotating said gears together under pressure.

10. The combination with a spindle for supporting a master gear, of a spindle for supporting a pinion, means for positioning said spindles in angular relation to permit intermeshing engagement of the master gear and pinion, a support for the pinion spindle movable toward said master gear, a third spindle adapted to support a second master gear for rolling engagement with the pinion, a support for said last named spindle movable toward said first master gear, means for moving the second master gear spindle and pinion spindle towards the first named master gear to engage all of said gears under considerable pressure, means for rotating one only of said spindles to effect solely through the intermeshing engagement of master gears and pinion a rotation of all of said spindles, and anti-friction bearings for the pinion and master gear spindles.

11. In a machine of the class described, a master gear, means for meshing a previously generated cold blank and a master gear under considerable pressure, means for effecting a rolling movement between said master gear and blank while engaged under such pressure and anti-friction bearings for absorbing the thrusts and reducing the friction set up by such rolling engagement.

12. In a machine for producing gears, the combination with a spindle adapted to support a gear blank having teeth previously cut therein slightly thicker than required in the final gear, of a second spindle for supporting a master gear, means for rotating the two spindles to roll the blank while cold and the master gear together, and means for exerting a high pressure on said master gear and blank during said rolling movement to force the teeth of one member toward the bottom of the tooth spaces of the other member.

13. In a machine for producing gears, the combination with a spindle adapted to support a gear blank having teeth previously cut therein, a support upon which said blank spindle is journaled, of a second spindle for supporting a master gear, a support upon which said second spindle is journaled, means for rotating one of said spindles to roll the blank while cold with said master gear by the inter-engagement of master gear and blank, means for moving one of said supports toward the other for exerting a high pressure upon said master gear and blank during said rolling movement to force the teeth of one member toward the bottom of the tooth spaces of the other member, and anti-friction bearings disposed between said spindles and their respective supports for reducing the friction set up by the rolling engagement of blank and master gear under pressure.

14. In a machine for producing gears, the combination with a spindle adapted for supporting a tapered gear blank having teeth previously cut therein, of a second spindle arranged at an angle to the first named spindle and adapted for supporting a master gear, means for imparting rotary movement to said spindles to roll the blank while cold with said master gear, means for effecting a high pressure between said master gear and blank during their rolling engagement, and anti-friction radial and axial thrust bearings for both said spindles for reducing the friction set up by such rolling engagement under pressure.

15. In a machine for producing gears, the combination with a spindle adapted to support a tapered gear blank having teeth previously cut therein, of a second spindle arranged at on angle to the first named spindle and adapted to support a master gear, means for driving one only of said spindles to roll the blank while cold with said master gear by the inter-engagement of master gear and blank, means for effecting a high pressure between the master gear and blank during their rolling inter-engagement, and anti-friction radial and axial thrust bearings for both said spindles for reducing the friction set up by such rolling engagement under pressure.

16. In a machine for producing gears, the combination with a spindle adapted to support a tapered gear blank, of a second spindle arranged at an angle to the first named spindle and adapted to support a master gear, means for adjusting one of said spindles bodily in a direction substantially at right angles to the axis of the other spindle, means for imparting rotary movement to said spindles to roll said master gear and blank together, means for effecting a high pressure between the master gear and blank during their rolling inter-engagement, and anti-friction radial and axial thrust bearings for both said spindles for reducing the friction set up by such rolling engagement under pressure.

17. In a machine for producing gears, the combination with a spindle adapted to support a tapered gear blank, of a second spindle arranged at an angle to the first spindle and adapted to support a master gear, means for adjusting one of said spindles bodily to offset the axis of the member carried thereby relative to the axis of the member carried by the other spindle, means for imparting rotary movement to said spindles to roll said blank and master gear together, means for effecting a high pressure between the master gear and blank during their rolling inter-engagement, and anti-friction radial and axial thrust bearings for both of said spindles for reducing the friction set up by such rolling inter-engagement, under pressure.

18. In a machine for producing gears, the combination with a spindle adapted to support a tapered gear blank, of a second spindle arranged at an angle to the first named spindle and adapted to support a master gear, means for adjusting one of said spindles bodily in a direction substantially at right angles to the axis of the other spindle, means for adjusting one of said spindles bodily to offset the axis of the member carried thereby relative to the axis of the member carried by the other spindle, means for imparting rotary movement to said spindles to roll the blank and master gear together, means for effecting a high pressure between the master gear and blank during their rolling inter-engagement, and anti-friction radial and axial thrust bearings for both of said spindles for reducing the friction set up by their rolling engagement under pressure.

19. In a machine for producing gears, the combination with a spindle adapted to support a tapered gear blank having teeth previously cut therein, of a second spindle arranged at an angle to the first named spindle and adapted to support a master gear, means for adjusting one of said spindles bodily in a direction substantially at right angles to the axis of the other spindle, means for driving one only of said spindles to roll the master gear and blank while cold together by their inter-engagement, means for effecting a high pressure between the master gear and blank during their rolling inter-engagement, and anti-friction radial and axial thrust bearings for both said spindles for reducing the friction set up by such rolling engagement under pressure.

20. In a machine for producing gears, the combination with a spindle adapted to support a tapered gear blank having teeth previously cut therein, of a second spindle arranged at an angle to the first named spindle and adapted to support a master gear, means for adjusting one of said spindles bodily to offset the axis of the member carried thereby relative to the axis of the member carried by the other spindle, means for driving one only of said spindles to roll the blank while cold with said master gear solely by the inter-engagement of master gear and blank, means for effecting a high pressure between the master gear and blank during their rolling inter-engagement and anti-friction radial and axial thrust bearings for both said spindles for reducing the friction set up by such rolling engagement under pressure.

21. In a machine for producing gears, the combination with a spindle adapted to support a tapered gear blank having teeth previously cut therein, of a second spindle arranged at an angle to the first named spindle and adapted to support a master gear, means for adjusting one of said spindles bodily in a direction substantially at right angles to the axis of the other spindle, means for adjusting one of said spindles bodily to offset the axis of the member carried thereby relative to the axis of the member carried by the other spindle, means for driving one only of said spindles to roll the blank while cold with said master gear solely by the inter-engagement of the master gear and blank, means for effecting a high pressure between the master gear and blank during their rolling inter-engagement, and anti-friction radial and axial thrust bearings for both said spindles for reducing the friction set up by such rolling engagement under pressure.

22. In a machine for producing gears, the combination with a spindle adapted to support a tapered pinion blank having teeth previously cut therein, of a second spindle arranged at an angle to the first named spindle and adapted to support a master gear, a third spindle adapted to support a second master gear, also arranged at an angle to the first named spindle, a movable support for one of said spindles, means for imparting rotary movement to said spindles to roll said pinion blank while cold with said master gears, means for moving said support to force the teeth of the master gears towards the bottoms of the tooth spaces of the blank and exert a high pressure upon said gears and blank during rolling and anti-friction bearings for each of said spindles to reduce the friction set up by their rolling engagement under pressure.

23. In a machine for producing gears, the combination with a spindle adapted to support a tapered pinion blank having teeth previously cut therein, of a second spindle arranged at an angle to the first named spindle and adapted to support a master gear, a third spindle arranged at an angle to the first named spindle and adapted to support a second master gear, a movable support for one of said spindles, means for rotating one only of said spindles to roll said pinion blank while cold with the master gears solely by the inter-engagement of the master gears and pinion blank, means for moving said support to force the teeth of the master gears toward the bottoms of the tooth spaces of the blank and to exert a high pressure upon said gears and blank during rolling, and anti-friction bearings for each of said spindles for reducing the friction set up by the rolling engagement of master gears and blank under pressure.

24. In a machine for producing gears, a base, an upright secured to said base, a support slidable on said upright, a spindle journaled in said support, a carrier slidably adjustable on said base for adjustment in a direction at right angles to the axis of the first spindle, a second spindle, one of said spindles being adapted to support a blank having teeth previously cut therein and the other of said spindles being adapted to support a master gear, a support in which the second spindle is journaled, said support being angularly adjustable on said carrier to position said second spindle at an angle to the first named spindle, means for imparting rotary motion to said spindles, means for moving said first named support to exert a high pressure upon said master gears and blank during rolling, anti-friction radial and axial thrust bearings for both of said spindles and a bracing member connecting said carrier and upright.

25. In a machine for producing gears, a base, an upright secured to said base, a support slidable on said upright, a spindle journaled in said support, a carrier slidably adjustable on said base for adjustment in a direction at right angles to the axis of the first spindle, a second spindle, one of said spindles being adapted to support a gear blank having teeth previously cut therein and the other of said spindles being adapted to support a master gear, a support in which the second spindle is journaled, said support being angularly adjustable on said carrier to position said second spindle at an angle to the first named spindle, means for rotating one only of said spindles to roll the master gear and blank together solely by their inter-engagement, means for moving the first named support to exert a high pressure on the master gear and blank during rolling, anti-friction radial and axial thrust bearings for said spindles, and a bracing member connecting said carrier and upright.

26. In a machine for producing gears, a base, an upright secured to said base, a support slidable on said upright, a spindle journaled in said support, a carrier slidably adjustable on said base for adjustment in a direction at right angles to the axis of the first spindle, a second spindle, one of said spindles being adapted to support a gear blank and the other of said spindles being adapted to support a master gear, a support in which the second spindle is journaled, said support being angularly adjustable on said carrier to position said second spindle at an angle to the first named spindle, means for adjusting one of said spindles bodily on its support to offset the axis of the member carried thereby relative to the axis of the member carried by the other spindle, means for imparting rotary motion to said spindles to roll the master gear and blank together, mean for moving the first named support to exert a high pressure on said master gear and blank during rolling, anti-friction radial and axial thrust bearings for said spindles, and a bracing member connecting said carrier and upright.

27. In a machine for producing gears, a base, an upright secured to said base, a support slidable on said upright, a rotatable spindle mounted on said support, a carrier slidably adjustable on said base for adjustment in a direction at right angles to the axis of the first spindle, a second spindle, one of said spindles being adapted to support a gear blank and the other of said spindles being adapted to support a master gear, a support on which the second spindle is mounted, said support being angularly adjustable on said carrier to position said second spindle at an angle to the first named spindle, an eccentric sleeve carried by one of said supports in which one of said spindles is journaled, said sleeve being adjustable to offset the axes of master gear and blank relatively to each other, means for imparting rotary motion to said spindles, means for moving said first named support to exert a high pressure on said master gear and blank during rolling, and anti-friction radial and axial thrust bearings for said spindles.

28. In a machine for producing gears, a base, an upright secured to said base, a support slidable on said upright, a rotatable spindle mounted on said support, a carrier slidably adjustable on said base for adjustment in a direction at right angles to the axis of said spindle, a second spindle, one of said spindles being adapted to support a gear blank and the other of said spindles being adapted to support a master gear, a support in which said second spindle is mounted, said support being angularly adjustable on said carrier to position said second spindle at an angle to the first named spindle, an eccentric sleeve carried by one of said supports in which one of said spindles is journaled, said sleeve being adjustable to offset the axes of blank and master gear relatively to each other, means for imparting rotary motion to said spindles, means for moving the first named support to force the teeth of the master gear towards the bottom of the tooth spaces of the blank and to exert a high pressure on said master gear and blank during rolling, anti-friction radial and thrust bearings for each of said spindles, and a bracing member connecting said carrier and upright.

In witness whereof, we have hereunto signed our names.

JAMES E. GLEASON.
ERNEST C. HEAD.